(12) United States Patent
Adi et al.

(10) Patent No.: US 8,443,453 B2
(45) Date of Patent: May 14, 2013

(54) AD HOC TRUST DELEGATION IN HUMAN BASED WORKFLOW SYSTEMS USING ONE TIME ACCESS KEY

(75) Inventors: Asaf Adi, Qiryat Ata (IL); Nili Guy, Qiryat Ata (IL); David Franklin Manning, Victoria (CA); Michael Cain Mansell, Langford (CA); Yoav Rubin, Haifa (IL); Gilad Moredehi Saadoun, Haifa (IL); Gal Shachor, Yokneam (IL); Avi Yaeli, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 12/903,268

(22) Filed: Oct. 13, 2010

(65) Prior Publication Data
US 2012/0096543 A1    Apr. 19, 2012

(51) Int. Cl.
*G06F 7/04* (2006.01)
(52) U.S. Cl.
USPC .......................................................... 726/27

(58) Field of Classification Search .................... 726/18, 726/27–30; 707/999.001, 999.009, 954
See application file for complete search history.

(56) References Cited

U.S. PATENT DOCUMENTS

| | | | | |
|---|---|---|---|---|
| 7,647,423 | B2 * | 1/2010 | Das et al. | 709/238 |
| 8,108,860 | B2 * | 1/2012 | Fussell | 718/101 |
| 8,219,431 | B2 * | 7/2012 | Maeda et al. | 705/7.13 |
| 8,291,019 | B1 * | 10/2012 | Rochelle et al. | 709/205 |
| 2002/0078007 | A1 * | 6/2002 | Herrero | 707/1 |
| 2007/0005548 | A1 * | 1/2007 | Kelly | 707/1 |
| 2007/0067772 | A1 | 3/2007 | Bustamante | |
| 2008/0091782 | A1 | 4/2008 | Jakobson | |

* cited by examiner

*Primary Examiner* — Beemnet Dada

(57) ABSTRACT

A method of ad hoc trust delegation in human-based workflow systems using one-time access key is provided herein. The method may include the following steps: generating a unique access key to a workflow system in response to a delegation of trust to one or more users; associating the unique access key with a specified portion of a workflow within the workflow system; embedding the unique access key in a message sent to the one or more users; and providing the one or more users with a one-time access to the workflow system, such that the access is limited to the specified portion of the workflow, in response to applying the unique access key to the workflow system.

20 Claims, 3 Drawing Sheets

AD HOC TRUST DELEGATION IN HUMAN BASED WORKFLOW SYSTEMS USING ONE TIME ACCESS KEY

BACKGROUND

1. Technical Field

The present invention relates to human based workflow systems and more particularly, to delegating tasks in such systems.

2. Discussion of the Related Art

Managing and monitoring of human tasks in an organization may be carried out using human-based workflow systems. In such workflow systems, one or more users are assigned, by another user, with tasks which they are then required to perform. While some existing workflow systems use emails to notify whenever a new task has been assigned, a user cannot delegate that task to another user by forwarding the email. Specifically, existing workflow systems do not enable any actual work on that task by any user that is not registered within the workflow system.

As a result, existing workflow systems require prior knowledge of the users involved and so users outside the organization or users that are not registered in the workflow system cannot participate. Additionally, any trust delegation must be carried out from within the workflow environment so that casual users may be forced to work outside their normal, preferred environments.

A partial and non satisfactory solution for trust delegation in a workflow system may be by providing a first user with the credentials of a second user so that the first user may be entitled to exercise all the capabilities of the second user within the workflow system. However, the drawbacks of such a solution are clear from data security and control perspectives.

BRIEF SUMMARY

One aspect of the invention provides a method of ad hoc trust delegation in human-based workflow systems using one-time access key. The method may include the following steps: generating a unique access key to a workflow system in response to a delegation of trust to one or more users; associating the unique access key with a specified portion of a workflow within the workflow system; embedding the unique access key in a message sent to the one or more users; and providing the one or more users with a one-time access to the workflow system, such that the access is limited to the specified portion of the workflow, in response to applying the unique access key to the workflow system.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
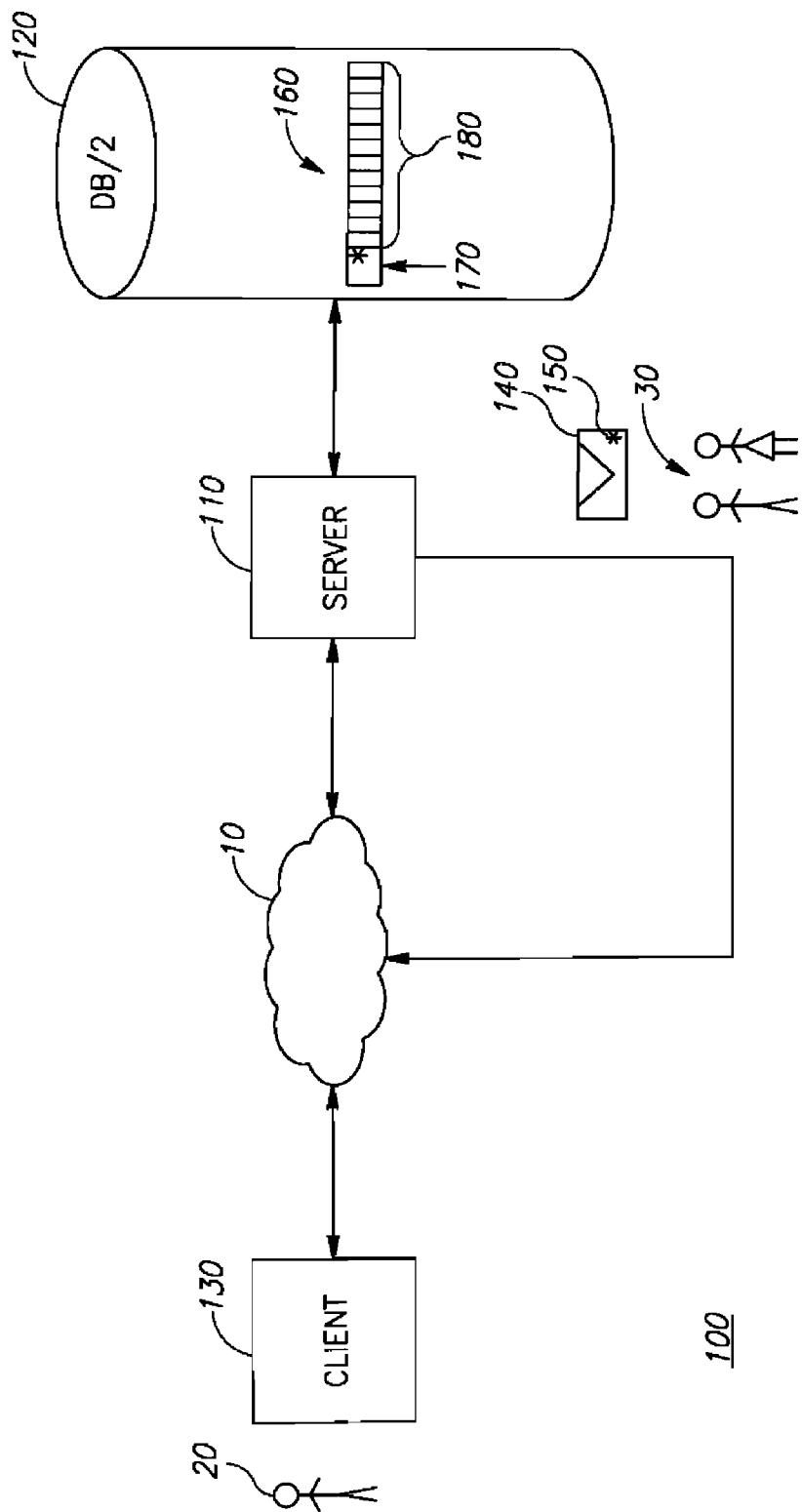
FIG. 1 is a high level schematic block diagram illustrating a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "workflow management system" or simply "workflow system" as used herein in this application refers to a computer system that is configured for managing human-based workflow within an organization by defining a series of tasks to produce a final outcome or outcomes. Workflow management systems enable users to define different workflows for different types of jobs or processes. On some of the stages along the workflow, one or more users are responsible for performing a specific task. Once the task is complete, the workflow software is configured such that the users that are responsible for the next task are notified and receive the data they need to execute their step within the workflow. Workflow systems require that all users provided with access to the workflow are authorized users that are defined within the specific workflow and are further provided with a specified access to the workflow enabling the carrying out of tasks within the workflow.

The term "relational database" as used herein in this application refers to a database that matches data by using common characteristics found within the data set. The resulting groups of data are organized and are much easier for many people to understand. The grouping utilizes a relational model. The software used to carry out the grouping is referred to as a relational database management system.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating a system according to some embodiments of the invention. System 100 may include a client terminal 130 connected to a server 110 over a computer network 10. Server 110 may be further in communication with a database 120 that may be in a form of a relational database such as, but not limited to, DB/2 by IBM. Database 120 is configured to store all the data accessible to users registered within a workflow system running on server 110 and database 120.

Delegating user 20 is a registered user within the aforementioned workflow system whereas one or more users 30 are not registered with the workflow system. Whenever delegating user 20 wishes to delegate trust (whether access, task and the like) to the one or more users 30 so that they will be able to access database 120 and perform tasks, client terminal 130 sends a message to server 110 holding information regarding the scope of the access that is required which is actually the portion of the workflow that may be accessible as well as the capabilities that should be available to the one or more users 30. In response, server 110 generates a unique access key 150 to the workflow system. Server 110 further associates unique access key 150 with a specified portion of the workflow within the workflow system. Finally, server 110 embeds unique access key 150 in a message 140 and sends it to the one or more users 30.

Unique access key 150 is configured to provide the one or more users 30 with a one-time access to the workflow system, such that the access is limited to the specified portion of the workflow. The access is provided whenever unique access key 150 is applied by one or more users 30 to the workflow system over computer network 10. Specifically, within database 120, a specified portion of the memory 160 is tagged with a unique access tag 170 that corresponds with unique access key 150. Content 180 may be only made accessible to one or more users 30 by applying unique access key 150 to unique access tag 170.

Consistent with one embodiment of the invention, unique access key 150 provides a one-time access that authorizes one or more users 30 to perform a plurality of operations within the workflow systems as if they were registered users, all according to the delegation by delegating user 20. For example, one or more users 30 may be entitled to view, amend, and add content associated with content 180 that were made accessible by the one-time access. A common scenario for this embodiment is in situations in which cooperation with users from different organizations is required and the cooperation necessitates sharing of common documents for viewing and editing. In such a case, delegating user 20 may share forms or documents with one or more users 30 that are from a different organization and still allow them to view and edit specified portion of the forms via direct access to content 180 on database 120.

Consistent with one embodiment of the invention, the one-time access may be limited to authorizing one or more users 30 to perform only some of the tasks that are valid within the specified portion of the workflow. In such a scenario, delegating user 20 wishes to limit the capabilities or access to content 180 of one or more users 30 to minimal, for data security reasons for example.

Consistent with one embodiment of the invention unique access key 150 may be configured such that the one-time access is blocked to all other users 30 upon completion of a task associated with the specified portion of the workflow, by at least one of users 30. This embodiment can be used whenever delegating user 20 delegates a single task for several users and wishes to avoid interference between the users.

Consistent with one embodiment of the invention, unique access key 150 may be embedded in a unified resource identifier (URI) or a unified resource locator (URL) both of which can be added to message 140 that may be in a form of an email. One or more users 30 that receive the email may simply used the URI or URL to access the workflow system wherein unique access key 150 is automatically compared to unique access tag 170 prior to allowing access to content 180.

Figure 2:
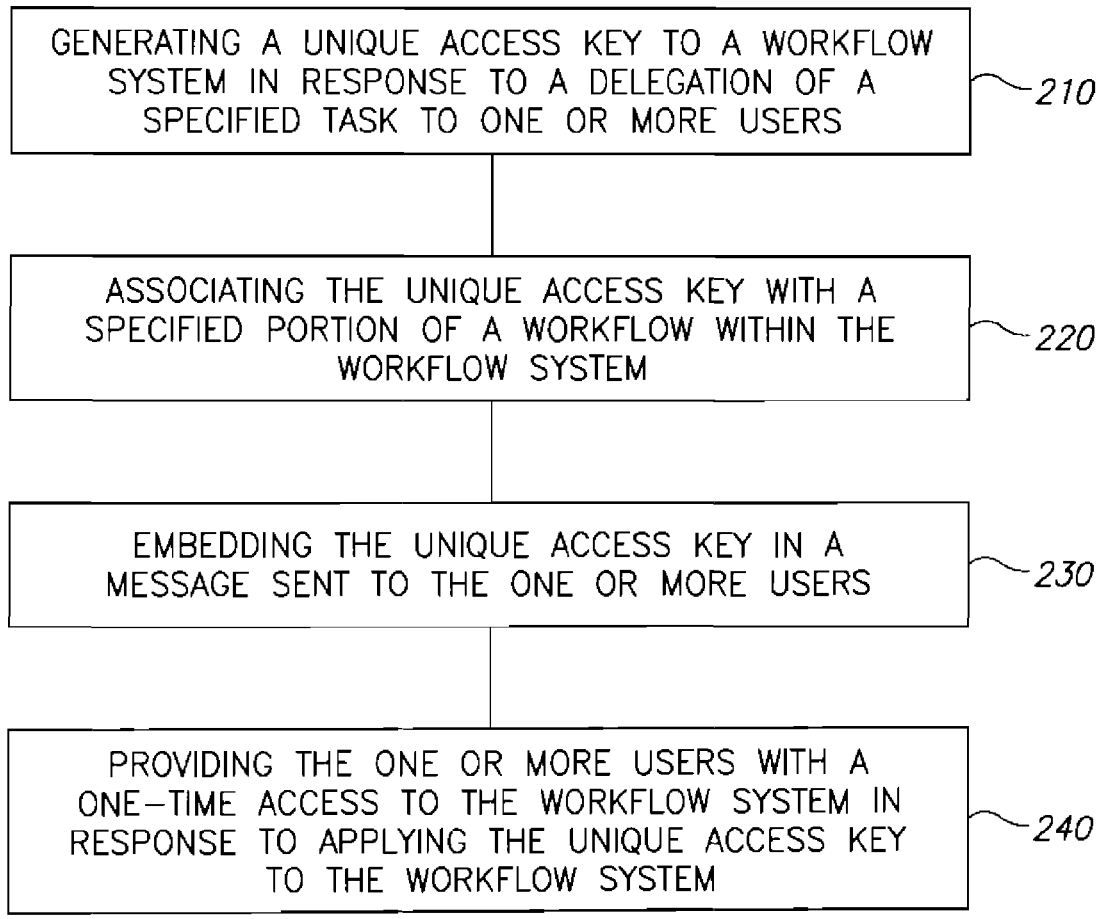
FIG. 2 is a high level flowchart diagram illustrating a method according to some embodiments of the invention.

FIG. 2 is a high level flowchart diagram illustrating a method according to some embodiments of the invention. It is understood that method 200 may not be necessarily implemented using the aforementioned architecture of system 100. Method 200 may include the following stages in order to carry out embodiments of the invention. In a first stage, a unique access key to a workflow system is being generated in response to a delegation of trust to one or more users 210. In a second stage, the unique access key is being associated with a specified portion of a workflow within the workflow system 220. In a third stage, the unique access key is embedded in a message sent to the one or more users 230. In a forth stage, the one or more users are being provided with a one-time access to the workflow system 240. Specifically, the unique access key is configured such that the access is limited to the specified portion of the workflow. The access is further provided in response to applying the unique access key to the workflow system.

Figure 3:
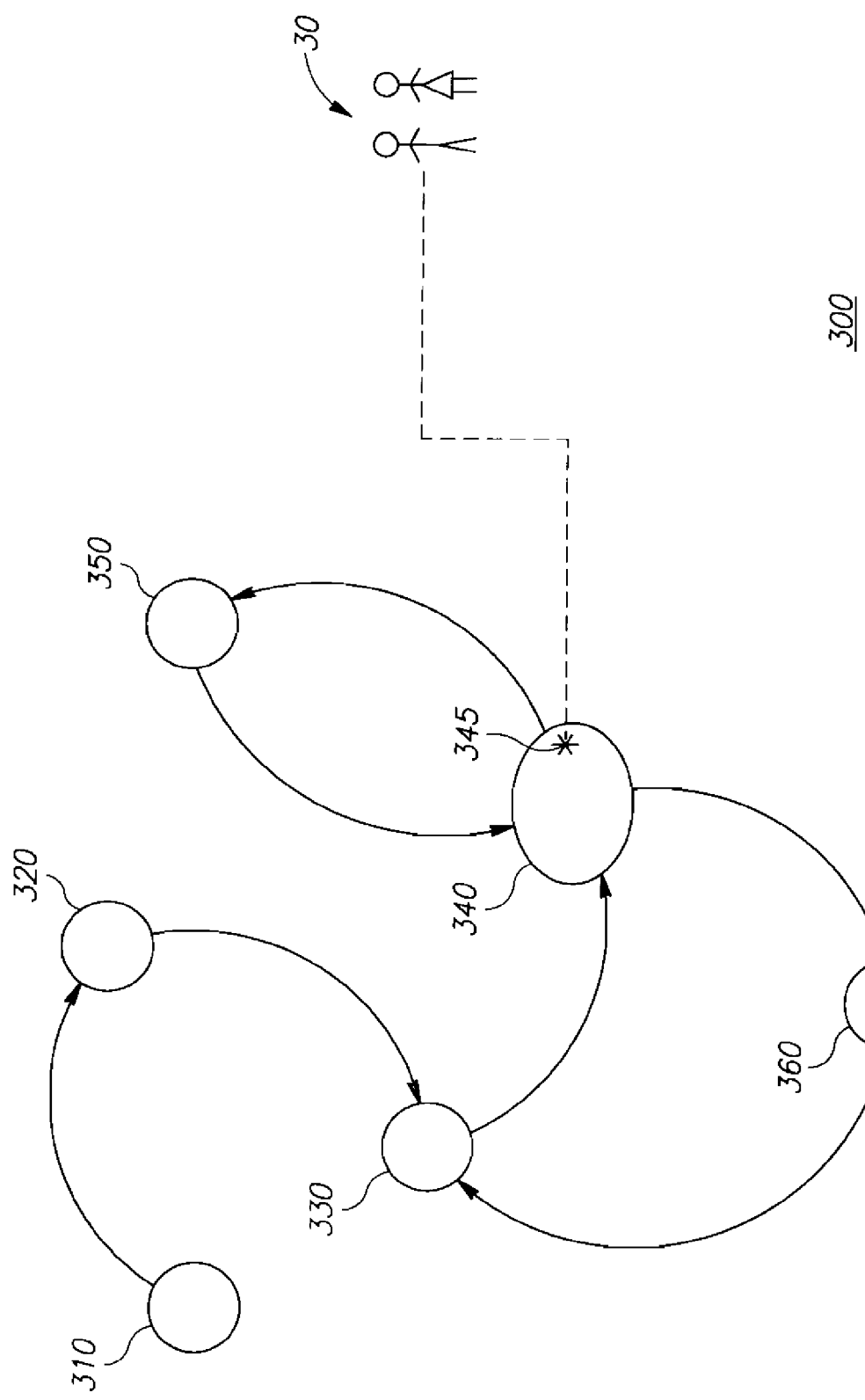
FIG. 3 is a state machine diagram illustrating an aspect according to some embodiments of the invention.

FIG. 3 is a state machine diagram 300 illustrating an aspect according to some embodiments of the invention. States 310-360 and the arcs between them define the work flow of the human-based workflow system to which a direct access to potentially one or more users 30 generally not authorized by the workflow, may be required. In response to the generation of the unique access key and the association of a portion of the workflow with a one-time access, a starting point indicator 345 is set over state diagram 300 specifically in state 340.

The specified portion may include, for example, states 340, 350, 360 and 330 and may be further limited such that only certain operations are authorized. The one-time access authorizes the one or more users to perform some or all the tasks that are valid in the states contained within the specified portion of state diagram 300.

Thus, one or more users 30 may gain access to any state within the specified portion in order to perform the delegated task. Alternatively, one or more users 30 may gain access to any content accessible on states along the specified portion so that the one or more users 30 may amend, and add content in accordance with the one-time delegation.

Consistent with one embodiment of the invention, the one-time access is blocked upon completion of a task associated with the specified portion of the workflow, by at least one of the users. Alternatively, some states may be blocked while others may be still accessible.

The reminder of the application is a non-limiting example for trust delegation consistent with embodiments of the present invention. It is understood that the example is for illustrative purposes only and other uses may be available while practicing other embodiments of the present invention. Delegating user 20 submits a travel request to workflow system 100. Server 110 determines the next task to perform and the specific person of the one or more user 30 and generates a unique non trivial key based on the task and the person. The unique key is stored on server 110. Workflow system 100 then sends an email to the specified one of the one or more users 30 to perform the task. The email contains a special URL that can be forwarded. By this, an ad hoc trust delegation (first degree trust delegation) was carried out from delegating user 20 to the specified person of the one or more users 30.

The URL may contain the unique key generated based on the task and the person. The specified person of the one or more users 30 may then forward the URL on to another person of the one or more users 30 so that another trust delegation is carried out (second degree trust delegation). Then, anyone who receives the email and clicks on the URL is logged into workflow system 100 and specifically database 120. Any authorized person may then perform some or all the tasks, get access to some or all the content, and may or not be blocked upon completion of some or all the tasks within the specified portion of the workflow, as explained above in earlier sections of this application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
    generating a unique access key to a workflow system;
    wherein the workflow system is associated with a relational database holding content and further associated with a workflow;
    associating the unique access key with a delegating person assigned with a specified task planned to be carried out in a specified portion of a workflow within the workflow system;
    embedding the unique access key in a message sent to a delegated person being a person other than the delegating person; and
    providing the delegated person with a one-time access to the workflow system, wherein the access is limited to carrying out the specified task within the specified portion of the workflow, in response to applying the unique access key to the workflow system,
    wherein at least one of: the generating, the associating, the embedding, and the providing, is executed by at least one computer processor.

2. The method according to claim 1, wherein the one-time access authorizes the delegated person to perform at least one of: view, amend, and add content associated with content that was made accessible by the one-time access.

3. The method according to claim 1, wherein the one-time access authorizes the delegated person to perform at least some of the tasks that are valid within the specified portion of the workflow.

4. The method according to claim 1, wherein the one-time access is blocked upon completion of the task assigned to the delegating person and associated with the specified portion of the workflow.

5. The method according to claim 1, wherein the associating comprises tagging a specified address on a database associated with the workflow system with a tag, wherein the tagged address is accessible by matching the unique access key with the tag.

6. The method according to claim 1, wherein the delegated person is not an authorized user of the workflow system.

7. The method according to claim 1, wherein the message is an email.

8. The method according to claim 1, wherein the unique access key is a Uniform Resource Identifier (URI).

9. A system comprising:
    a workflow system associated with a relational database holding content and further associated with a workflow; and
    a server configured to:
    (i) generate a unique access key to the workflow system;
    (ii) associate the unique access key with a delegating person assigned with a specified task planned to be carried out in a specified portion of the workflow within the workflow system; and
    (iii) embed the unique access key in a message sent to a delegated person being a person other than the delegating person, wherein the unique access key is configured to provide the delegated person with a one-time access to the workflow system, wherein the access is limited to carrying out the specified task within the specified portion of the workflow, when the unique access key is applied to the workflow system.

10. The system according to claim 9, wherein the one-time access authorizes the delegated person to perform at least one of: view, amend, and add content associated with content that was made accessible by the one-time access.

11. The system according to claim 9, wherein the one-time access authorizes the delegated person to perform at least some of the tasks that are valid within the specified portion of the workflow.

12. The system according to claim 9, wherein the one-time access is blocked upon completion of the task assigned to the delegating person and associated with the specified portion of the workflow.

13. The system according to claim 9, wherein the server is configured to associate the unique access key by tagging a specified address on the relational database with a tag, wherein the tagged address is accessible by matching the unique access key with the tag.

14. The system according to claim 9, wherein the delegated person is not an authorized user of the workflow system.

15. A computer program product, the computer program product comprising:
- a non-transitory computer readable medium having computer readable program embodied therewith, the computer readable program comprising:
- computer readable program configured to generate a unique access key to a workflow system:
- the computer readable program configured to associate the unique access key with a delegating person assigned with a specified task planned to be carried out in a specified portion of a workflow within the workflow system;
- wherein the workflow system is associated with a relational database holding content and further associated with the workflow;
- the computer readable program configured to embed the unique access key in a message sent to a delegated person being a person other than the delegating person; and
- the computer readable program configured to provide the delegated person with a one-time access to the workflow system, wherein the access is limited to carrying out the specified task within the specified portion of the workflow, when the unique access key is applied to the workflow system.

16. The computer program product according to claim 15, wherein the one-time access authorizes the delegated person to perform at least one of: view, amend, and add content associated with content that was made accessible by the one-time access.

17. The computer program product according to claim 15, wherein the one-time access authorizes the delegated person to perform at least some of the tasks that are valid within the specified portion of the workflow.

18. The computer program product according to claim 15, wherein the one-time access is blocked upon completion of the task assigned to the delegating person and associated with the specified portion of the workflow.

19. The computer program product according to claim 15, further comprising computer readable program configured to associate the unique access key by tagging a specified address on the relational database with a tag, wherein the tagged address is accessible by matching the unique access key with the tag.

20. The computer program product according to claim 15, wherein the delegated person is not an authorized user of the workflow system.

* * * * *